(12) United States Patent
Bosio et al.

(10) Patent No.: US 7,476,286 B2
(45) Date of Patent: Jan. 13, 2009

(54) METHOD OF MANUFACTURING A TYRE AND APPARATUS FOR BUILDING A TYRE

(75) Inventors: Gian Luigi Bosio, Milan (IT); Andrea Seveso, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 101 days.

(21) Appl. No.: 10/499,672

(22) PCT Filed: Dec. 20, 2002

(86) PCT No.: PCT/EP02/14615

§ 371 (c)(1),
(2), (4) Date: Nov. 23, 2004

(87) PCT Pub. No.: WO03/055668

PCT Pub. Date: Jul. 10, 2003

(65) Prior Publication Data

US 2005/0067088 A1 Mar. 31, 2005

(30) Foreign Application Priority Data

Dec. 27, 2001 (IT) .................. PCT/IT01/00655

(51) Int. Cl.
*B29D 30/32* (2006.01)
(52) U.S. Cl. .................. 156/131; 156/403; 156/406.2
(58) Field of Classification Search .............. 156/131, 156/403, 406.2, 396, 136, 422, 398
See application file for complete search history.

(56) References Cited

U.S. PATENT DOCUMENTS

| 1,871,608 | A | * | 8/1932 | Hallinan | 198/803.12 |
|---|---|---|---|---|---|
| 3,082,811 | A | * | 3/1963 | Axel et al. | 156/403 |
| 3,556,900 | A | * | 1/1971 | Edney et al. | 156/403 |
| 3,598,673 | A | * | 8/1971 | Caretta | 156/132 |
| 3,690,989 | A | * | 9/1972 | McCafferty et al. | 156/403 |
| 4,084,998 | A | * | 4/1978 | Eichholz et al. | 156/403 |
| 4,369,086 | A | | 1/1983 | Nakahama et al. | |
| 4,553,894 | A | | 11/1985 | Mukae et al. | |
| 4,634,489 | A | * | 1/1987 | Dupommier | 156/403 |

(Continued)

FOREIGN PATENT DOCUMENTS

EP 0 376 405 A1 7/1990

(Continued)

*Primary Examiner*—Geoffrey L Knable
(74) *Attorney, Agent, or Firm*—Finnegan, Henderson, Farabow, Garrett & Dunner, L.L.P.

(57) ABSTRACT

A bead wire loader device includes a shaft including two bearer elements. Each bearer elements includes a groove including a V-profile. A device for positioning tire bead wires on the building drum includes two support plates, a plurality of gripper units, and actuating devices for synchronous and uniform movement of the gripper units. The gripper units are arranged circumferentially around openings in the support plates and include at least one bead wire grasping element including a throat forming part of a single circumferential gripping profile common to the grasping elements. A tire building apparatus for a vehicle wheel includes a building drum and a bead wire placing system for fitting bead wires onto the building drum. The bead wire placing system includes the bead wire loader device and the device for positioning the bead wires. A related method of manufacturing a tire for a vehicle wheel is also disclosed.

21 Claims, 6 Drawing Sheets

U.S. PATENT DOCUMENTS

| | | | |
|---|---|---|---|
| 4,685,992 A * | 8/1987 | Irie | 156/396 |
| 4,726,861 A * | 2/1988 | Vorih et al. | 156/131 |
| 4,927,488 A | 5/1990 | Abe et al. | |
| 4,964,931 A | 10/1990 | Ring | |
| 4,995,531 A | 2/1991 | Summers | |
| 5,051,149 A | 9/1991 | Ishii | |
| 5,141,590 A * | 8/1992 | Siegenthaler et al. | 156/422 |
| 5,730,829 A * | 3/1998 | Conger et al. | 156/396 |
| 5,858,165 A * | 1/1999 | Takasuga | 156/403 |
| 6,623,583 B2 * | 9/2003 | Cornet et al. | 156/131 |

FOREIGN PATENT DOCUMENTS

| | | |
|---|---|---|
| FR | 1.254.640 | 2/1961 |
| FR | 2 458 384 | 1/1981 |
| GB | 1074138 | 6/1967 |
| GB | 1 582 734 | 1/1981 |
| JP | 56115241 A * | 9/1981 |
| SU | 1 597 298 A1 | 10/1990 |
| SU | 1 657 407 A1 | 6/1991 |
| WO | WO 94/13498 | 6/1994 |

* cited by examiner

METHOD OF MANUFACTURING A TYRE AND APPARATUS FOR BUILDING A TYRE

CROSS-REFERENCE TO RELATED APPLICATIONS

This application is a national-phase entry under 35 U.S.C. § 371 from International Application No. PCT/EP02/14615, filed Dec. 20, 2002, in the European Patent Office, the content of which is relied upon and incorporated herein by reference; additionally, Applicants claim the right of priority under 35 U.S.C. § 119(a)-(d) based on patent application No. PCT/IT01/00655, filed Dec. 27, 2001, in the Italian Patent Office.

BACKGROUND OF THE IINVENTION

1. Field of the Invention

The present invention relates in general terms to the placing of bead cores on a drum for building carcasses for tyres.

2. Description of the Related Art

A tyre generally comprises a carcass structure including at least a carcass ply, operatively associated with a pair of annular reinforcing structures suitable for matching with a mounting rim, each annular reinforcing structure comprising at least a bead wire, and folded around them, at least a belt structure at a radially external position with respect to said at least a carcass ply, and a tread band at a radially external position with respect to the belt structure.

During the building of a tyre, a cylindrical carcass ply comprising one or more reinforcing plies (containing cords embedded in a layer of an elastomeric material) is formed on a suitable drum. At least two bead cores are then positioned on this sleeve, coaxially with the axis of rotation of the drum, which coincides with the axis of rotation of the tyre, in axially separated positions.

The cylindrical carcass ply constructed on the said drum will then be shaped into a torus, possibly after removal from the abovementioned drum (e.g. by contracting the drum).

The bead wire is a hoop of metal wires having different cross sections: for example, square, rectangular or hexagonal. The so-called Alderfer type has wires laid axially side by side and radially on top of each other, and they are rubberized.

The twisted type has a basically round cross section, and the metal wires that form it are wound together around a central core. This type of bead wire is typically not rubberized.

The process of assembling bead wires onto the carcass ply, by an automatic or semi-automatic procedure, generally involves the following steps:

a) the bead wire is located on a device generally known as a loader;
b) the bead wire is gripped by a device generally known as a gripper;
c) the bead wire is positioned on the carcass ply.

Step a) can be done either manually by an operator or automatically. Either way, the bead wire can be made to swing when positioned on the loader device. It is important in this step for the bead wire to stop all swinging motion quickly and be stationary, and if possible already coaxial with the building drum, when presented to the members of the gripper device, so that it can be gripped automatically, quickly and correctly.

The gripper device is often designed in such a way that its parts maintain/position the bead wire coaxial with the drum axis, so that it can be correctly and easily positioned on the carcass ply in step c).

An important requirement for bead wire placing systems relates to the flexibility of production changes. Bead wires come in a wide range of diameter measurements, depending on which type of tyre is being built. It is advantageous for economical and production reasons to find a bead wire placing system capable of controlling bead wires of different diameters with the minimum of replacements or adjustments of its devices.

Many tyre bead wire placing systems have been proposed. Many of these grasp the bead wire along its radially inner surface and/or employ magnetic means, in this case acting, for example, on its lateral surface. In particular, this depends on the fact that the bead wires are often loaded and positioned on the drum with their filler (a ring of elastomeric material of circular or roughly triangular section) already assembled on the radially outer surface of the bead wire.

For example, U.S. Pat. No. 5,051,149 (in the name of Bridgestone Corporation) describes, among other things, devices for loading, gripping and positioning bead wires to which the filler is already assembled.

The said positioning device consists of a pair of support rings, attached to the inner surface of which is a plurality of radially moveable gripper devices. Each of the said gripper devices possesses, attached in a position corresponding to the portion facing the building drum, a curved segment which itself comprises a plurality of magnets embedded in its inner surface so as to grip a bead wire plus its filler.

In addition, each support ring is connected to a cylinder with a piston whose end portion is connected to the abovementioned gripper devices. When the said piston extends, all the gripper devices are moved synchronously in a radially inward direction, and out again, by means of a complex lever system.

The said loader device consists of two specular axially opposed units mounted on the outer end portions of the shaft that carries the building drum. Each of the said units comprises mechanical gripper devices which, when moved radially outward, encounter the circumferentially inner surface of a bead wire supplied by an operator.

When the said loader devices come into relation with the corresponding positioning devices, the magnets present in the latter capture the bead wire and hold it in exact alignment with the axis of the building drum.

The Applicant has noticed that the bead wire placing systems proposed in the prior art are very complex, bulky and costly.

To be specific, the amount of radial space required by these known systems is linked with their ability to accept a wide range of bead wire measurements. This flexibility, which is desirable when it comes to changing production, also affects the structure and disposition of the gripper units that must be adapted or even replaced when different bead wire measurements are required, and this obviously involves slowing down the rate of production and, in the case of replacement, necessitates somewhere to store the various parts.

Furthermore, producing a self-centring radial movement usually demands, as seen above, a complex system of gears and levers that weigh down the entire system and increase its cost.

SUMMARY OF THE INVENTION

The Applicant has found possible to simplify and at the same time to improve the process for tyre building by reducing the radial space requirements of the bead wire placing system, and providing it with characteristics of flexibility and speed when it comes to production changes, while maintaining high levels of reliability of the system and of quality of the finished product, by loading the bead wire damping out any swinging movement that may have been given to it by the operator or by the automatic feeder system, gripping said bead wire by means of gripper units that can be readily adapted to differing characteristics of the product being built, and that are operated by a simple and flexible device for actuating the said units In a first aspect, the present invention relates to a method of manufacturing a tyre for vehicle wheels, said tyre comprising a carcass structure having at least a carcass ply operatively associated with a pair of annular reinforcing structures suitable for matching with a mounting rim, each annular reinforcing structure comprising at least a bead wire, said at least one carcass ply being turned up at least on one of said annular reinforcing structures, said method comprising the steps of:

building a cylindrical carcass sleeve comprising said at least one carcass ply and said pair of annular reinforcing structures,
    applying a belt structure to said cylindrical carcass sleeve at a radially external position,
    applying a tread band to said belt structure at a radially external position,
    shaping said tyre into a toroidal conformation,
    vulcanizing said tyre,
    wherein said building step comprises at least the steps of:
    feeding said at least a carcass ply onto a drum,
    placing said annular reinforcing structure to a position radially external to said carcass ply,
    turning up said carcass ply on said annular reinforcing structure, wherein the step of placing said annular reinforcing structure to a position radially external to said carcass ply comprises at least the steps of:

locating said bead wire on a loader,
    damping out any swinging on said bead wire,
    gripping said bead wire by grasping elements,
    positioning said bead wire on said at least one carcass ply.

Preferably, said step of gripping said bead wire is performed by operating said grasping elements in a radial internal direction.

Preferably, said step of operating said grasping elements in a radial internal direction is effected with a synchronous movement.

In a second aspect, the present invention relates to a tyre building apparatus for vehicle wheels including a building drum, and
    a bead wire placing system for fitting bead wires onto the said building drum, provided with:
        a device for loading the said bead wires, and
        a device for positioning the said bead wires, comprising:
            two support plates mutually moveable in both axial directions, with respect to the said drum, each having an opening whose cross section is not smaller than that of the said drum;
            a plurality of gripper units arranged circumferentially on the said two support plates around the said opening and operable radially in both directions with respect to the axis of rotation of the said drum, and actuating devices for synchronous and uniform movement of the said gripper units, wherein each of the said gripper units includes, at its radially inward end, at least one grasping element for the said bead wires that possesses, at least on the radially inward surface, a throat lying in a plane perpendicular to the said axis of rotation, forming part of a single circumferential gripping profile common to the said grasping elements, and said loader device includes, parallel to the axis of the said drum, a shaft supported cantilever-fashion near its axially outer end, comprising two bearer element, one for each bead wire, which bearer elements show, at least on their upper surface, a groove lying in plane perpendicular to the said axis of rotation, with a V profile in cross section perpendicular to the said plane. The said shaft is preferably moveable at least vertically in both directions.

In the building apparatus according to the invention, the said one or more grasping elements present on each of the said gripper units are preferably fitted with devices for detecting correct positioning of the bead wire in the said throat. The said detector devices are preferably pin-type sensors, preferably connected to proximity detectors.

Also preferably, in the building apparatus according to the present invention, the said actuating devices include a flexible and inextensible element kinematically connected to the said gripper units and connected to a traction device.

In a preferred embodiment of the building apparatus of the invention, the said one or more grasping elements are suitably shaped discs.

The said disc-shaped grasping elements are preferably provided as a pair for each gripper unit, wherein case the carrier arm to which the said discs are connected is preferably shaped like a V whose apex is oriented in a radially outward direction.

The building apparatus of the invention preferably has at least eight grasping elements.

The building apparatus of the invention preferably comprises gripper units uniformly distributed around the said opening of the support plate. They preferably comprise a bracket that has notches for adjusting the position of each gripper unit with respect to the said support plate.

The flexible and inextensible element forming part of the said actuating devices of the system of the invention may be for example a toothed belt, preferably reinforced with wires embedded in an elastomeric material and laid generally parallel along the longitudinal direction of the belt.

The said flexible and inextensible element is preferably kinematically connected to the said gripper units by a system of pulleys and clamps.

The said traction device preferably comprises a pneumatic cylinder, inside which a piston projecting from both bases of the said cylinder slides, and a stop element to control the end of stroke of one end of the said piston.

The bearer elements of the said loader device each preferably comprise at least two shaped wheels positioned in a carrier block connected to the said shaft.

The said groove present in the said bearer element, in particular in the said wheels, have a V profile in cross section, preferably forming an angle of not less than 90°, preferably between about 100° and about 140° inclusive, more preferably about 120°.

In a second aspect, the present invention relates to a bead wire placing system for fitting tyre bead wires onto a building drum, comprising a loader device, a placing device and an actuating device as described above.

In a third aspect, the present invention relates to a bead wire loader device, as described above, for supplying the said bead wires to an automatic device for positioning bead wires on a tyre building drum.

In a fourth aspect, the present invention relates to a device for positioning bead wires on a tyre building drum as described above.

BRIEF DESCRIPTION OF THE DRAWINGS

Other characteristics and advantages will become clearer in the course of detailed description of a preferred, but not exclusive, embodiment of a tyre building apparatus according to the present invention. This description will be set out hereinbelow with reference to the attached drawings, which are provided purely as an indication and are therefore not limiting. In the drawings.

DETAILED DESCRIPTION OF THE EXEMPLARY EMBODIMENTS

A tyre generally comprises a carcass structure having at least a carcass ply operatively associated with a pair of annular reinforcing structures suitable for matching with a mounting rim, each annular reinforcing structure comprising at least a bead wire, said at least one carcass ply being turned up at least on one of said annular reinforcing structures, a belt structure at a radially external position with respect to said at least a carcass ply, comprising at least a belt layer, and a tread band at a radially external position with respect to said belt structure.

A method for manufacturing a tyre generally comprises the steps of:

building a cylindrical carcass sleeve comprising said at least one carcass ply and said pair of annular reinforcing structures, thus yielding said carcass structure;

applying said belt structure to said cylindrical carcass sleeve at a radially external position, applying said tread band to said belt structure at a radially external position, shaping said tyre into a toroidal conformation, vulcanizing said tyre.

The method according to the invention further comprises the steps of:

feeding said at least a carcass ply onto a drum, placing said annular reinforcing structures to a position radially external to said carcass ply, turning up said carcass ply on said annular reinforcing structure.

Figure 1:
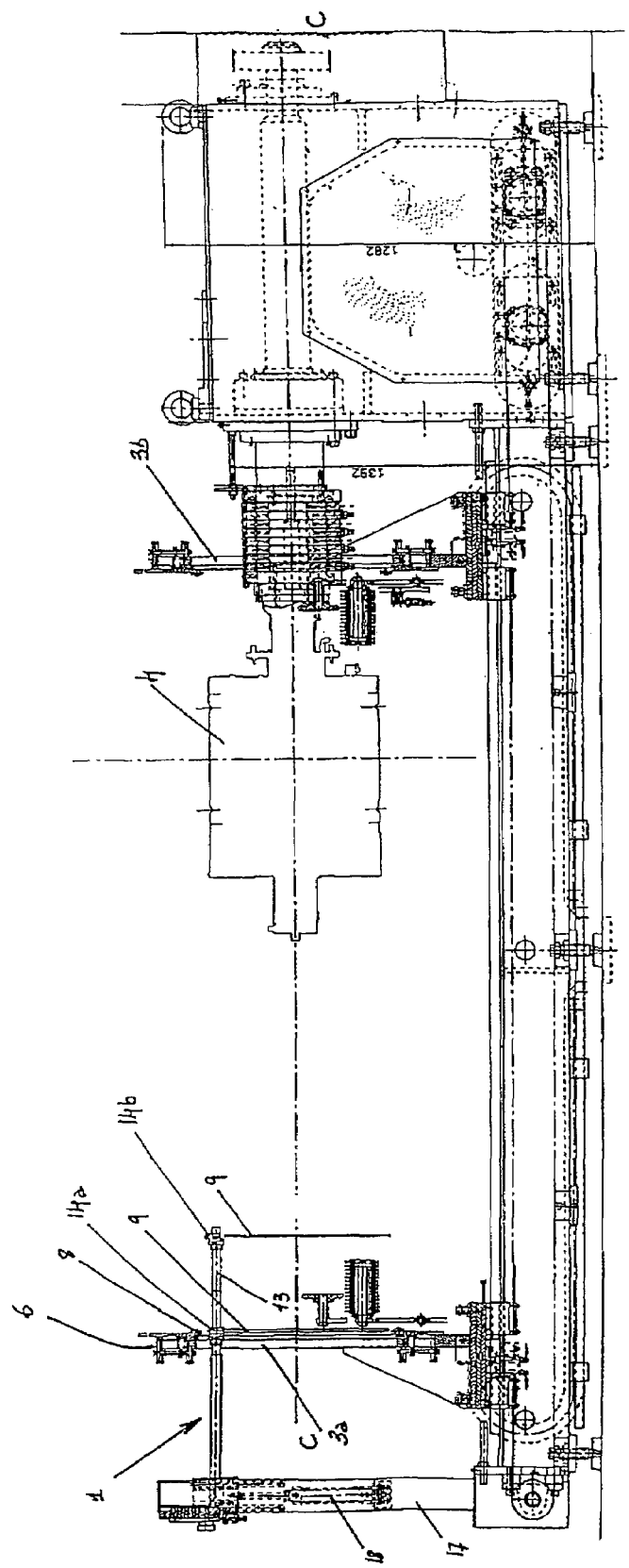
FIG. 1 shows a general view, in side elevation, of a tyre building apparatus comprising a bead wire placing system according to the present invention.

FIG. 1 shows a general assembly, according to the present invention, of a tyre building apparatus comprising a bead wire placing system. The building apparatus is illustrated in the pre-positioning step of the bead wires: two bead wires 9 have been located on bearer elements 14*a*, 14*b* of a loader device 1. The bearer element 14*a* is aligned, in a plane perpendicular to the axis of rotation C-C of the building drum 4 (which is shown schematically in the drawing), with grasping element 8 mounted on gripper units 6 present on a support plate 3*a* belonging to a positioning device according to the invention. The said gripper units 6 are shown radially retracted.

Another support plate 3*b* is positioned on the far side of the building drum 4.

In the rest of this description, the expression "axial direction" means a direction parallel to the abovementioned axis C-C.

As an alternative, the said support plate 3*b* may be situated on the same side of the building drum 4 as the said support plate 3*a*. The movements in the axial direction of the said support plates 3*a*, 3*b* and, where relevant, of the building drum 4 are mutual in both directions, and these units are moved, both independently and synchronously, by at least one drive system—e.g. a belt drive.

Figures 5, 6, 7:
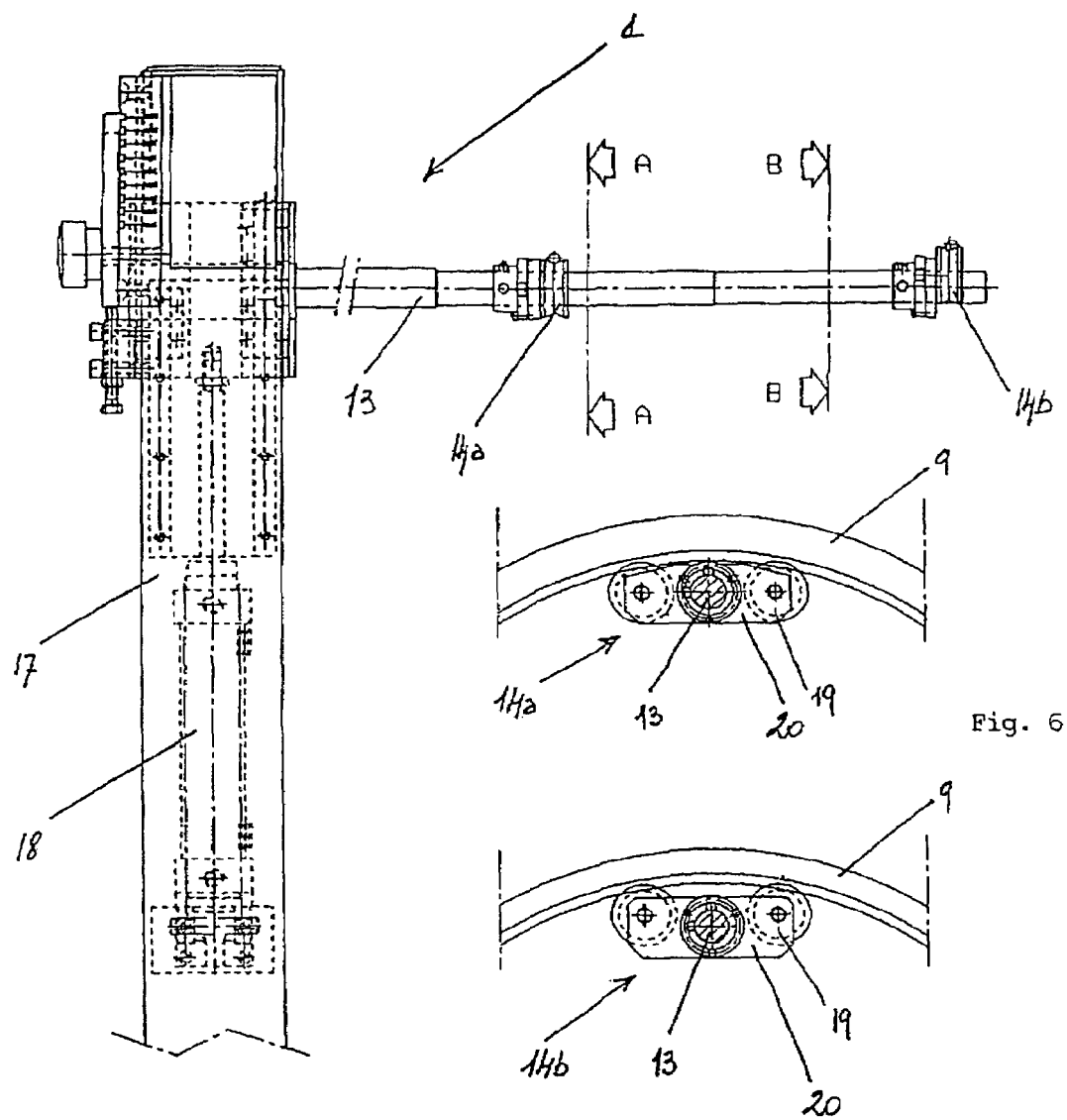
FIG. 5 shows a side view of the loader device according to the invention.
FIGS. 6 and 7 show a front view on plane A-A and plane B-B, respectively, of FIG. 5, of bearer elements according to the invention.

FIG. 5 illustrates one embodiment of a loader device 1 according to the present invention. It has a shaft 13 projecting from a frame 17, and bearer elements 14*a*, 14*b*. The said frame 17 contains a first cylinder 18 whose piston enables the shaft 13 to effect vertical movements in both directions. The said first cylinder 18 may be of any type capable of performing the said function, e.g. operating by fluid or oil under pressure.

The bearer elements 14*a*, 14*b* each comprise, in the case illustrated in FIGS. 6 and 7, two shaped wheels 19. These lie in the same plane perpendicular to the axis of the said shaft 13 and are positioned in a carrier block 20 connected to the said shaft 13. The said shaped wheels 19 are preferably not idle about their axis of rotation but instead fixed firmly in the said carrier block 20.

In the particular case illustrated, the said bearer elements 14*a*, 14*b* are slightly offset in the vertical direction with respect to the axis of the shaft 13; in particular, the said wheels 19 of the said bearer element 14*b* are higher, in terms of the axis of the said shaft 13, than those of the said bearer element 14*a*.

This specific arrangement becomes useful for placing bead wires for tyres having beads with two different diameters, as described for example in patent application WO94/13498 (in the name of Compagnie Generale des Etablissements Michelin—Michelin & CIE). Because of the different diameters of the said beads, the bead wires used in this type of tyre have different diameters; this characteristic is reflected in the different vertical positioning, relative to the axis of the said shaft 13, of the said bearer elements 14*a*, 14*b*, and in particular of the said shaped wheels 19, which will present the said bead wires to the positioning device so as to be coaxial with each other.

Figures 8A, 8B:
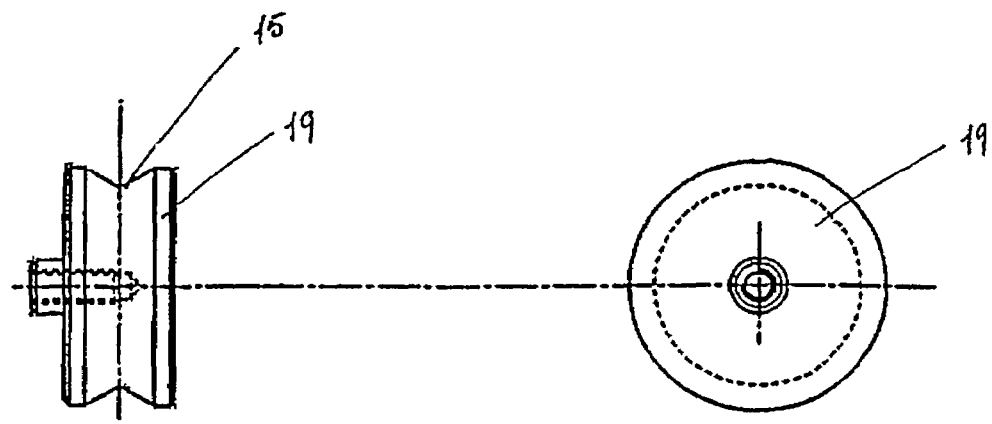
FIGS. 8*a* and 8*b* show a detail of a bearer element according to the invention in end view and side view, respectively.

The said shaped wheels 19 of the said bearer elements 14*a*, 14*b* have a groove 15 whose profile forms a V in the cross section of the plane containing the axis of the said shaft 13, as shown in greater detail in FIGS. 8*a* and 8*b*. The V profile of the said groove 15 has an angle of not less than 90°, preferably between about 100° and about 140° inclusive, and more preferably equal to about 120°. The said V profile, particularly with the said angular values, has been found to be very effective at almost instantaneously damping out any swinging movements imparted to the bead wire 9 by the operation of hanging the said bead wires on the said loader device 1. The result is surprising because the cross section of the bead wires is circular, which encouraged the idea that for the said profiles, cross sections of complementary shape were the best.

In alternative embodiments (not illustrated), a bearer element according to the invention may take the form of a block of suitable shape, e.g. a parallelepiped with at least one surface, in a vertically higher position relative to the axis of the said shaft, that is suitably curved and has a groove as described above.

The presence of shaped wheels 19 in the bearer devices 14a, 14b of the invention is preferred. In time, the point on which the bead wires 9 rest can become worn, and the fact that the said shaped wheels 19 can be turned to a new working position means that the whole of the surface of the said groove 15 can be used, thus greatly delaying the need to replace the part.

The locating of the said bead wires 9 on the said bearer elements 14a, 14b may be carried out either manually by an operator, or by suitable automatic feeder mechanisms. As stated earlier, the special V form of the grooves 15 of the said bearer elements 14a, 14b virtually instantaneously damps out any swinging movement that may have been given to the bead wires by the operator or by the automatic handling mechanism. The said bead wires 9 are therefore motionless in their plane when presented to the grasping elements 8.

After the said bead wires 9 are located on the respective bearer elements 14a, 14b, as diagrammatically illustrated in FIGS. 6 and 7, the said support plate 3a is moved axially towards the said bearer devices 14a, 14b until the grasping elements 8 are aligned with the said bearer element 14a in the same plane perpendicular to the C-C axis. Optionally, this alignment, and the reciprocal movements of the support plates 3a, 3b are governed by a suitable computer program.

Once the desired position is reached, gripper units 6, with the said grasping elements 8, are moved synchronously in an inward radial direction relative to the C-C axis, by an actuating device.

Figure 2:
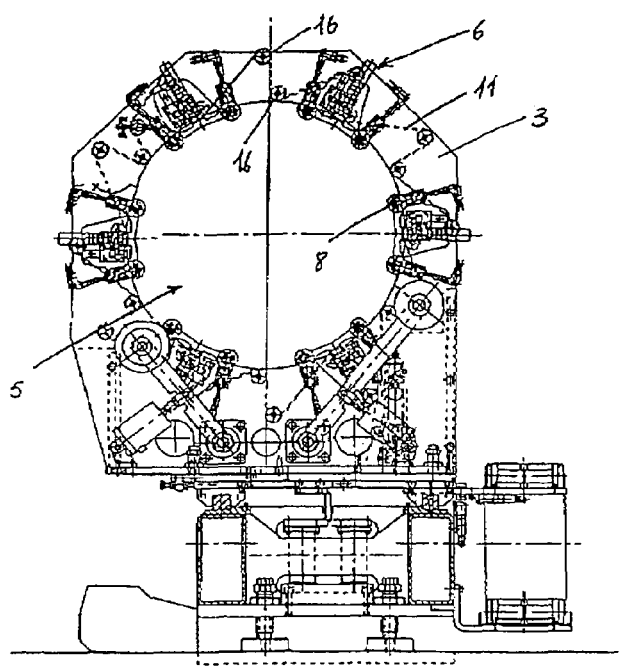
FIG. 2 shows a front view of the positioning device of the invention facing the building drum.
Figure 3:
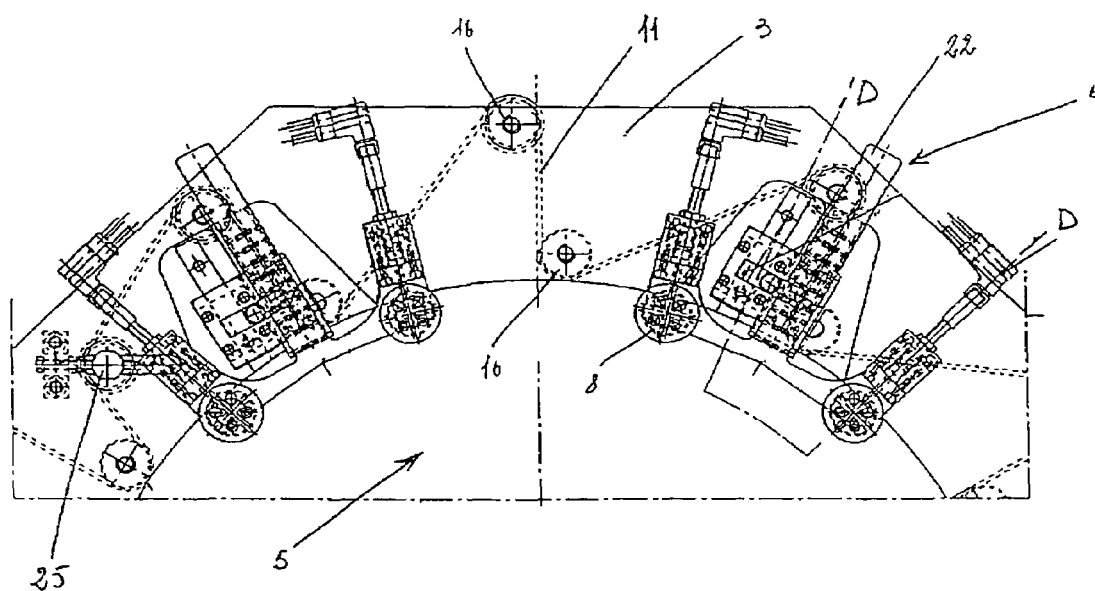
FIG. 3 shows a detail, in front view facing the building drum, of a support plate with gripper units, grasping elements and, partially, a flexible and inextensible element according to the present invention.

FIGS. 2 and 3 show a complete and a partial frontal view, respectively, facing the building drum 4, of a support plate 3 belonging to the positioning device of the invention.

In the case illustrated, the said gripper units 6 are arranged circumferentially and uniformly around an essentially circular opening 5 in the said support plate 3. There are six such gripper units 6, and each has one pair of grasping elements 8 in the form a shaped disc. There are preferably at least eight of the said grasping elements 8.

A V-shaped arm whose apex is oriented in a radially outward direction connects the grasping elements 8 of the said pair. Schematically, the said gripper units 6 have a T shape with the longer dimension oriented in a radially outward direction, while the shorter dimension is formed by the said V-shaped arm which connects the said pair of grasping elements 8.

The said opening 5 is coaxial with the axis of rotation C-C of the building drum 4.

Figure 4:
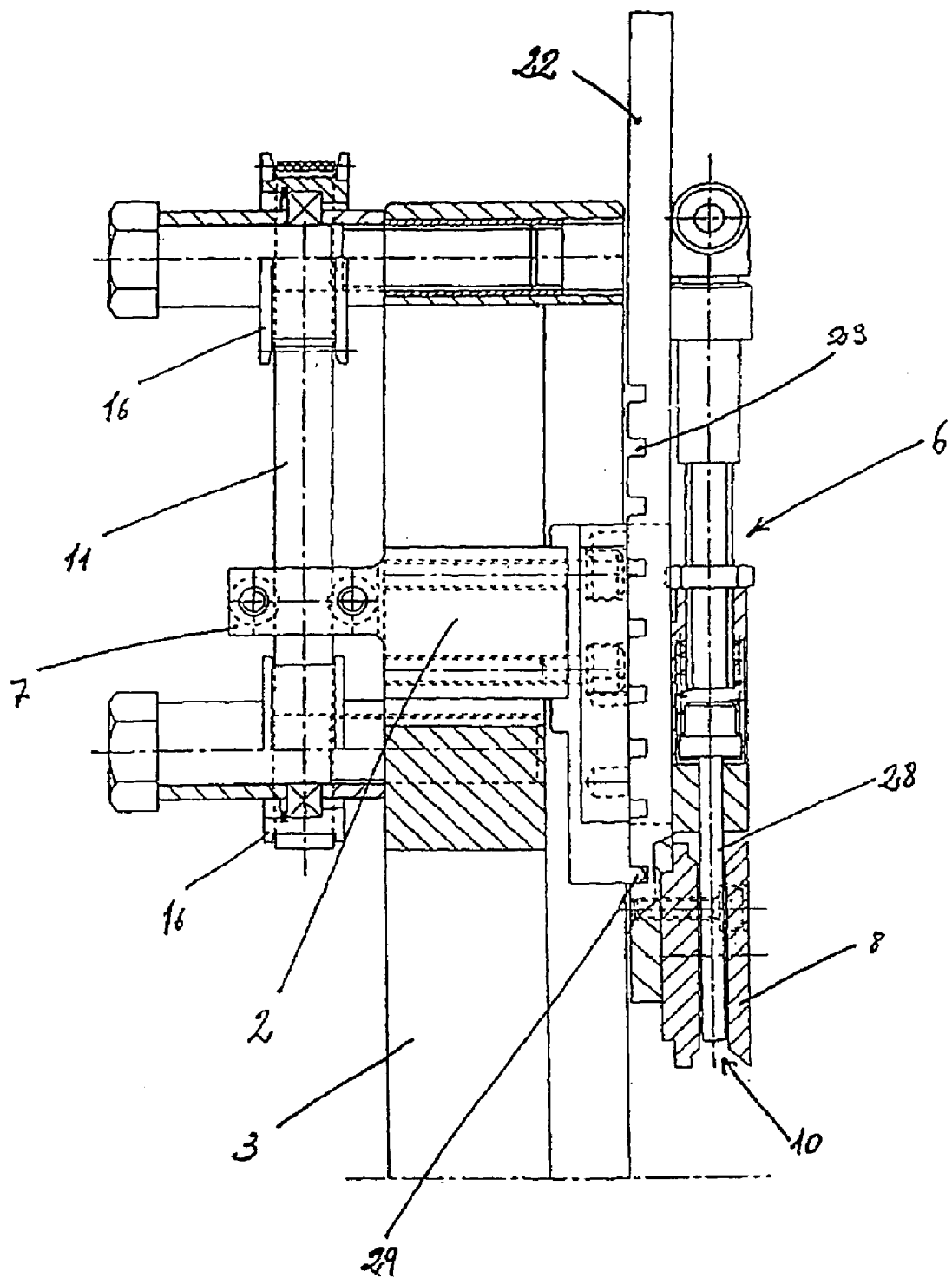
FIG. 4 shows a view in section taken on the line D-D as marked in FIG. 3, of a gripper unit inclusive of grasping element, according to the present invention.

Referring now to FIGS. 2, 3 and 4, an actuating device according to the invention comprises a flexible and inextensible element 11, such as a toothed belt, possibly reinforced with wires laid generally parallel with each other along the longitudinal direction of the said belt. The said flexible and inextensible element 11 is situated on the axially outward side of the support plate 3, that is the side hidden from the building drum 4, and is kinematically connected to all the said gripper units 6 of the said support plate 3 by a system of pairs of pulleys 16 and clamps 7.

In FIG. 3 a "tensioner" 25 is visible. This is preferably a tension adjusting roller and is useful for adjusting the length of the said flexible and inextensible element 11 when setting up the device.

The said pulleys 16 are coupled in radial planes at short circumferential distances, one pulley close to the radially outer edge and the other close to the radially inner edge of the said support plate 3.

The said clamps 7 (visible in FIG. 4), of which there is preferably at least one for each gripper unit 6, are connected to a bar 2 attached to the long arm of the abovementioned T, hereinafter referred to as the bracket 22, which runs through the said support plate 3 via a slot extending in a radial direction in which the said bar 2 can move in both directions. The clamps 7 securely fasten the said gripper units 6, by means of the said bar 2, to the flexible and inextensible actuating element 11.

On the axially inward side of the support plate 3, that is the side facing the building drum 4, the said bracket 22 is appropriately fitted between two tracks (not clearly visible) by means of, for example, a dovetail or other configuration suitable for vertical sliding of the said bracket 22.

In addition, in a preferred embodiment of the invention, the said bracket 22 may have, on the side facing the support plate 3, notches 23 for adapting the position of the gripper unit 6 to the particular measurement of the bead wire diameter. In particular, the said notches determine the positions of the bar 2 and gripper unit 6 relative to each other by coupling one of the said notches 23 with an index tooth 29 integral with the said bar. Advantageously, markings at each of the said notches 23 may indicate the bead wire diameters.

Figure 10:
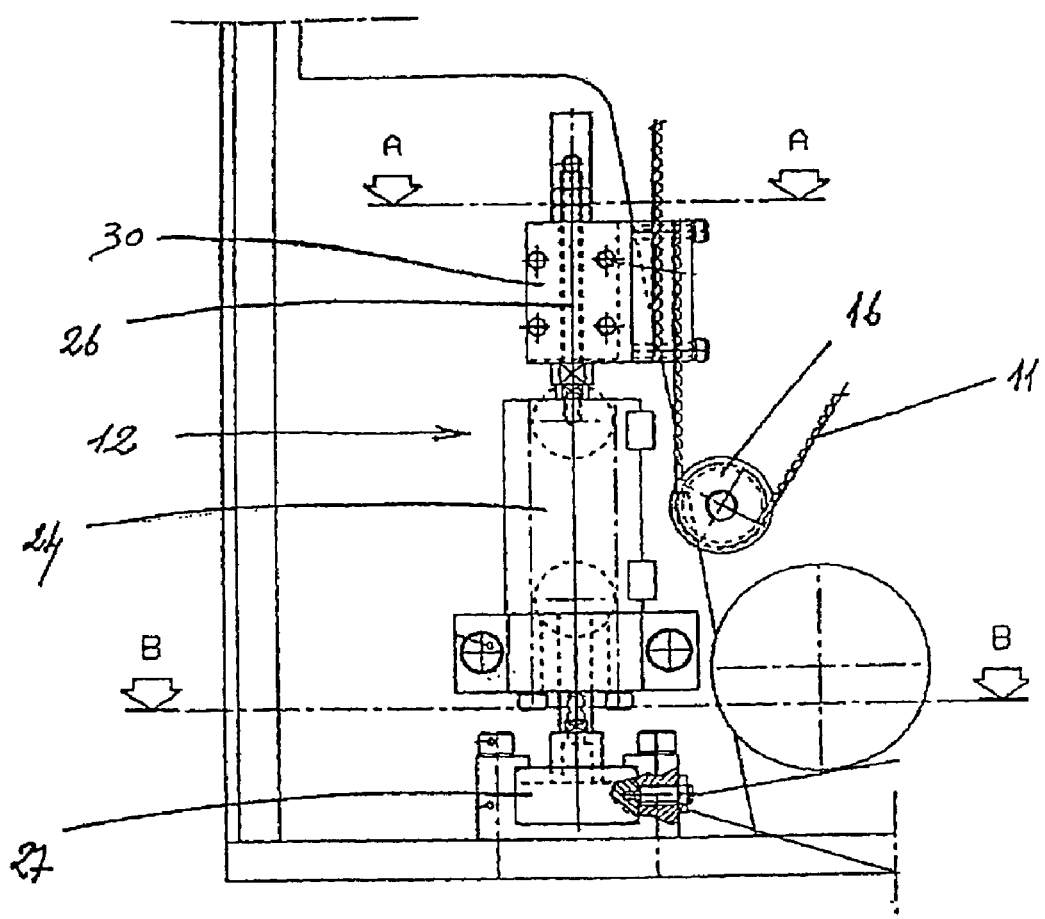
FIG. 10 shows a front view of a traction device according to the present invention.

The said flexible and inextensible element 11 is also connected kinematically to a traction device 12 which can be seen in FIG. 10.

The said traction device 12 is preferably a linear-motion mechanism such as, in the present case, a pneumatic cylinder 24, though it may be operated by fluid or oil under pressure, inside which a piston 26 projecting from both bases of the said cylinder slides. One end of the said piston 26 carries a clamp 30 to which the said flexible and inextensible element 11 is fastened. The said element 11 may be an endless loop, but preferably consists of a strip of suitable length with both its ends locked in the said clamp.

The end-of-stroke position of the other end of the said second piston 26 is controlled relative to the said support plate 3 by a stop element 27.

FIG. 10 represents the moment when the said second piston 26 has reached the upper end-of-stroke point: this position corresponds to the position of maximum radial retraction of the said gripper units 6 (as illustrated for example in FIGS. 2 and 3).

When the said piston 26 is lowered, the movement transmitted synchronously and uniformly to the gripper units 6 by the said flexible and inextensible element 11 moves the said gripper units 6 radially inwards towards said C-C axis, and makes the corresponding grasping elements 8 receive a bead wire 9.

The maximum radial advance of the gripper units 6 towards the said C-C axis, i.e. the advance which sets the said grasping elements 8 to the diameter of the bead wire in question, is defined by a stop element 27 which obstructs the movement of the said second piston 26 in the descending direction. In a preferred embodiment of the invention, the said stop element 27 can be adjusted as a function of the diameter of the bead wire 9 to be accepted. Alternatively there may be a plurality of interchangeable stop elements 27, each adapted to a different bead wire diameter.

As already explained, the synchronous and self-centring movement of the said gripper units 6 brings the corresponding grasping elements 8 into contact with the bead wire 9. The radially outer surface (extrados) of the said bead wire fits into the throat 10 of the said grasping elements 8.

In cross section, the throat 10 of the said grasping element 8, in the plane containing the said C-C axis, is a broken line resembling a funnel, as illustrated, for example, in FIG. 4.

Figure 9:
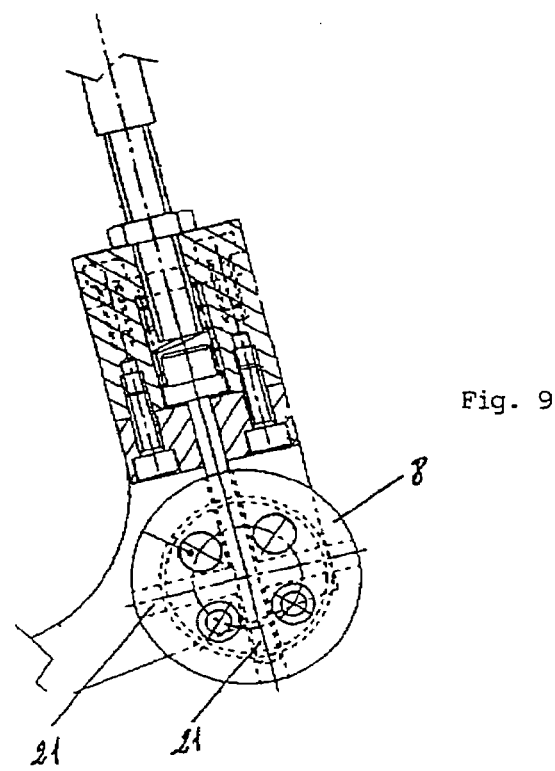
FIG. 9 shows a front view facing the building drum of a grasping element according to the present invention.

FIG. 9 shows in greater detail a grasping element 8 in the form of a shaped disc. The said disc contains internally two channels 21 that are basically perpendicular to each other.

The channel 21 whose axis is oriented essentially radially preferably contains a detector device 28 (visible in FIG. 4) to see that the bead wire is correctly positioned in the throat 10 of the said grasping element 8.

The said detector device 28 may be for example a pin-type sensor. The presence of the bead wire 9 in the said throat 10 pushes the said pin-type sensor in a radially outward direction and, by acting on an elastic mechanism, such as a retaining spring, causes it to make an electric contact which sends a signal to suitable proximity detectors.

In the same way as discussed with reference to the presence of shaped wheels 19 on the bearer devices 14a, 14b, the use of shaped discs for the said grasping elements 8 of the invention is preferred because it is possible to rotate its working position. In time, the point on which the bead wires rest on the said grasping element 8 can become worn, and the availability of elements in the form of a shaped disc enables the whole surface of the said throat 10 to be made use of, thereby considerably delaying the time when the part requires replacing.

Alternatively, the said grasping element may be, for each gripper unit 6, at least one block (not shown), preferably a pair, suitably shaped to take the extrados surface of the said bead wire 9.

In a similar way to the support plate 3a, the said support plate 3b is moved in an axial direction to align the respective grasping elements 8 with the said bearer element 14b. The axial movement of the said support plates 3a, 3b towards the said bearer elements 14a, 14b preferably occurs in an essentially synchronous manner, although, for simplicity of illustration, FIG. 1 shows a moment when the support plate 3a is already aligned with its bearer element 14a, while support plate 3b is still waiting beyond the building drum 4.

Once the said bead wire 9 is in the throat 10 of the said grasping elements 8 of the support plates 3a, 3b, and its correct position has been detected by the said detector device 28, the said loader device 1 disengages with a vertical lowering movement of the said shaft 13, which movement is controlled by the said cylinder 18 enclosed in the said frame 17 (as seen in FIG. 5).

In an alternative embodiment of the invention in which the said shaft is static, the translational movement of the bead wire from the bearer elements to the grasping elements takes place by means of a radial relative movement of the elements, optionally facilitated by opposing spring means. The special shaping of the said groove and throat facilitates this translational movement.

Following disengagement of the said loader device 1, the said support plates 3a, 3b move axially towards the building drum 4.

In an alternative embodiment, it is either the said drum 4 that moves axially towards the said plates, or both movements may coexist.

The relative positions taken up by the said support plates 3a, 3b with respect to each other, and both with respect to the building drum 4, is advantageously a function of the axial distance that it is wished to have between the said bead wires 9 on the carcass ply during tyre building.

Once the said support plates 3a, 3b have been appropriately positioned with respect to the building drum 4, and the said bead wires have been immobilized on the said carcass ply, e.g. by radial expansion of corresponding portions of the said drum, the said traction device 12 (FIG. 10) of each of the said support plates 3a, 3b is started. In particular, the said traction device 12 raises the said second piston 26 to the end of its stroke; the said movement of the piston pulls the said flexible and inextensible element 11 attached to the said second piston 26, causing it to travel around the said pulleys 16.

Consequently, the said flexible and inextensible element 11 carries with itself the said clamps 7 (FIGS. 3 and 4), causing the gripper units 6 to move synchronously and uniformly, radially away from the said opening 5.

This movement causes loss of contact between the said grasping elements 8 and the said bead wires 9. The plates are now moved axially away from the said drum 4 to fetch two new bead wires that have been placed in the meantime on the said loader device 1.

As clearly explained in the above description, in the method according to the invention the step of placing said annular reinforcing structures at radially external position over said carcass ply comprises at least the steps of:
locating said bead wire on a loader,
damping out any swinging on said bead wire,
gripping said bead wire by grasping elements,
positioning said bead wire on said at least one carcass ply.

In a preferred embodiment, as above set forth, said step of gripping said bead wire can be performed by operating said grasping elements in a radial internal direction.

Moreover, said step of operating said grasping elements in a radial internal direction can be effected with a synchronous movement.

The present invention offers significant advantages.

The placing system forming part of the tyre building apparatus of the present invention takes up little radial space, is able to work with a wide range of bead wire measurements, even including pairs of bead wires of different diameters, and is economically advantageous both as regards the speed with which production can be changed, and because of the intrinsically low cost of the bead wire grasping and bearer elements.

The gripper units, the traction device and the actuating device of the invention enable production to be changed quickly and without replacement of parts. In particular, the position of the gripper units on the bracket is adjusted by means of a male/female system (notch/tooth) which locks the said units in predetermined positions that are easily identifiable by markings, one per notch, by means of a connection device that allows the position of the said units on their bracket to be varied simply by slackening a fixing screw on the bracket.

The stop element of the piston of the traction device is preferably fitted with an adjustment mechanism for continuous adjustment of the position of the grasping elements. The technician may alternatively use a plurality of quick-change stop elements, although the adjustment of the position of the grasping elements will then be discontinuous (discrete amounts).

The flexible and inextensible element forming part of the actuating device is low cost and allows great flexibility in the construction of the system. Moreover, the said flexible and inextensible element dispenses with the need for mechanical components in the self-centring radial-motion mechanism, which inevitably lead over time to mechanical play developing between connected parts. Such mechanical play compromises the self-centring motion and the correct positioning of the bead wire. Added to this is the fact that the said flexible and inextensible element represents an excellent low-cost safety system, in as much as it can slide through the clamps, which comes into operation in the case of faults or wrong operations causing collision between the grasping elements and the building drum.

As highlighted earlier, the use of structures such as shaped discs and wheels as points of contact between, respectively, the grasping and bearer elements and the bead wire, means that the same element can be used in several different positions. This greatly reduces the operating cost. The said shaped discs and wheels may be made of plastic in order to avoid damage to the building drum in the event of machine faults or wrong operations creating interference between the various mechanical parts of the said devices.

The invention claimed is:

1. A method of manufacturing a tyre for a vehicle wheel, comprising:
    building a cylindrical carcass sleeve;
    applying a belt structure to the carcass sleeve at a position radially external to the carcass sleeve;
    applying a tread band to the belt structure at a position radially external to the belt structure;
    shaping the tyre into a toroidal conformation; and
    vulcanizing the tyre;
    wherein the tyre comprises:
        a carcass structure;
        the belt structure; and
        the tread band;
    wherein the carcass structure comprises:
        at least one carcass ply; and
        a pair of annular reinforcing structures;
        wherein the at least one carcass ply is operatively associated with the annular reinforcing structures,
    wherein the carcass sleeve comprises the at least one carcass ply and the annular reinforcing structures,
    wherein each annular reinforcing structure comprises at least one bead wire,
    wherein the annular reinforcing structures are suitable for mounting the tyre on a rim,
    wherein the at least one carcass ply is turned up on at least one of the annular reinforcing structures,
    wherein building the carcass sleeve comprises:
        feeding the at least one carcass ply onto a drum;
        placing at least one of the annular reinforcing structures at a position radially external to the at least one carcass ply; and
        turning up the at least one carcass ply on the at least one of the annular reinforcing structures;
    wherein placing at least one of the annular reinforcing structures at a position radially external to the at least one carcass ply comprises:
        locating the at least one bead wire by hanging the at least one bead wire on a loader;
        damping out any swinging of the at least one bead wire;
        gripping the at least one bead wire by grasping elements, the grasping elements comprising a plurality of shaped discs, including two shaped discs spaced circumferentially from one another on a radially inner end of a gripper unit support member, wherein gripping the at least on bead wire by the grasping elements includes engaging the bead wire within a recess defined between portions of the shaped discs; and
        positioning the at least one bead wire on the at least one carcass ply.

2. The method of claim 1, wherein gripping the at least one bead wire is performed by operating the grasping elements in a radially inner direction.

3. The method of claim 2, wherein operating the grasping elements in a radially inner direction is effected with a synchronous movement.

4. An apparatus for building a tyre for a vehicle wheel, comprising:
    a building drum; and
    a bead wire placing system for fitting bead wires onto the building drum;
    wherein the bead wire placing system comprises:
        a device for loading the bead wires; and
        a device for positioning the bead wires;
    wherein the loader device comprises a shaft parallel to an axis of rotation of the building drum,
    wherein the shaft is supported cantilever-fashion near an axially outer end of the shaft,
    wherein the shaft comprises two bearer elements,
    wherein each bearer element comprises, at least on an upper surface of the bearer element, a groove lying in plane perpendicular to the axis of rotation of the building drum,
    wherein the groove comprises a V-profile in a cross-section perpendicular to the plane,
    wherein the device for positioning the bead wires comprises:
        two support plates;
        a plurality of gripper units, the plurality of gripper units comprising a plurality of grasping elements; and
        actuating devices for synchronous and uniform movement of the gripper units;
    wherein the support plates are mutually moveable in both axial directions with respect to the building drum,
    wherein each support plate comprises an opening comprising a cross-section not smaller than a cross-section of the building drum,
    wherein the gripper units are arranged circumferentially on the support plates around the support plate openings,
    wherein the gripper units operate radially in both directions with respect to the axis of rotation of the building drum,
    wherein the plurality of grasping elements comprises, at a radially inner end of each gripper unit, two shaped discs spaced circumferentially from one another,
    wherein the two shaped discs comprise, at least on the radially inner surface, a throat lying in a plane perpendicular to the axis of rotation of the building drum, and
    wherein the throat forms part of a single circumferential gripping profile common to the grasping elements.

5. The apparatus of claim 4, wherein the shaft is moveable at least vertically in both directions.

6. The apparatus of claim 4, wherein the actuating devices include a flexible and inextensible element kinematically connected to:
    the gripper units; and
    a traction device.

7. The apparatus of claim 6, wherein the traction device comprises:
    a pneumatic cylinder;
    a piston; and
    a stop element.

8. The apparatus of claim 6, wherein the flexible and inextensible element is kinematically connected to the gripper units by a system of pulleys and clamps.

9. The apparatus of claim 4, wherein at least one of the grasping elements is fitted with a device for detecting a position of a respective bead wire in the throat.

10. The apparatus of claim 4, wherein the two shaped discs are connected by a V-shaped carrier arm, and
    wherein an apex of the V-shaped carrier arm is oriented in a radially outward direction.

11. The building apparatus of claim 4, wherein the plurality of grasping elements comprises at least eight grasping elements.

12. The apparatus of claim 4, wherein the gripper units are uniformly distributed around the openings.

13. The apparatus of claim 4, wherein the groove comprises an angle greater than or equal to 90°.

14. The apparatus of claim 4, wherein the groove comprises an angle greater than or equal to about 100° and less than or equal to about 140°.

15. The apparatus of claim 4, wherein the groove comprises an angle of about 120°.

16. The apparatus of claim 4, wherein the bearer elements each comprise at least two shaped wheels positioned in a carrier block connected to the shaft.

17. The apparatus of claim 4, wherein the gripper units each comprise a bracket.

18. The apparatus of claim 17, wherein the bracket comprises notches.

19. A bead wire placing system for fitting a tyre bead wire onto a building drum, comprising:
   a loader device;
   a placing device; and
   an actuating device for synchronous and uniform movement of units having a plurality of shaped discs, each unit comprising two of the shaped discs spaced circumferentially from one another on a radially inner edge of the unit, for gripping the bead wire, wherein the plurality of shaped discs define a recess between portions of the shaped discs for receiving the bead wire.

20. A bead wire loader device, comprising:
   a shaft parallel to an axis of rotation of a building drum;
   wherein the shaft is supported cantilever-fashion near an axially outer end of the shaft,
   wherein the shaft comprises two bearer elements,
   wherein the bearer elements each comprise at least two shaped wheels positioned in a carrier block connected to the shaft,
   wherein each bearer element comprises, at least on an upper surface of the bearer element, a groove lying in plane perpendicular to the axis of rotation of the building drum, and
   wherein the groove comprises a V-profile in a cross-section perpendicular to the plane.

21. A device for positioning tyre bead wires on a building drum, comprising:
   two support plates;
   a plurality of gripper units, the plurality of gripper units comprising a plurality of grasping elements; and
   actuating devices for synchronous and uniform movement of the gripper units;
   wherein the support plates are mutually moveable in both axial directions with respect to the building drum,
   wherein each support plate comprises an opening comprising a cross-section not smaller than a cross-section of the building drum,
   wherein the gripper units are arranged circumferentially on the support plates around the support plate openings,
   wherein the gripper units operate radially in both directions with respect to the axis of rotation of the building drum,
   wherein the plurality of grasping elements comprises, at a radially inner end of each gripper unit, two shaped discs spaced circumferentially from one another,
   wherein each of the shaped discs comprises, at least on a radially inner surface, a throat lying in a plane perpendicular to the axis of rotation of the building drum, and
   wherein the throat forms part of a single circumferential gripping profile common to the grasping elements.

\* \* \* \* \*

UNITED STATES PATENT AND TRADEMARK OFFICE
CERTIFICATE OF CORRECTION

| | | |
|---|---|---|
| PATENT NO. | : 7,476,286 B2 | Page 1 of 1 |
| APPLICATION NO. | : 10/499672 | |
| DATED | : January 13, 2009 | |
| INVENTOR(S) | : Bosio et al. | |

It is certified that error appears in the above-identified patent and that said Letters Patent is hereby corrected as shown below:

Claim 1, column 11, line 55, "least on bead" should read --least one bead--.

Signed and Sealed this

Twenty-sixth Day of May, 2009

JOHN DOLL
*Acting Director of the United States Patent and Trademark Office*